United States Patent
Rube

[15] 3,704,943
[45] Dec. 5, 1972

[54] SLIDE PROJECTOR FOR USE WITH STRAIGHT AND CIRCULAR SLIDE TRAYS

[72] Inventor: Helmut Rube, Endersbach, Germany

[73] Assignee: Robert Bosch Elektronik und Photokino GmbH, Stuttgart-Unterturkheun, Germany

[22] Filed: July 19, 1968

[21] Appl. No.: 746,123

[30] Foreign Application Priority Data
Aug. 18, 1967 Germany..........P 15 72 584.5

[52] U.S. Cl..................................................353/117
[51] Int. Cl. ............................................G03b 23/06
[58] Field of Search......353/116, 117, 103, 114, 107, 353/104, 118, 115

[56] References Cited
UNITED STATES PATENTS

| | | |
|---|---|---|
| 3,118,341 | 1/1964 | Weiss..........................353/115 |
| 3,233,511 | 2/1966 | Deeg..........................353/117 |
| 3,409,353 | 11/1968 | Zillmer......................353/117 |
| 3,413,060 | 11/1968 | Rube..........................353/115 |
| R26,619 | 7/1969 | Hall...........................353/117 |

OTHER PUBLICATIONS

"Liesegang" projector Literature.

Primary Examiner—Leonard Forman
Assistant Examiner—A. J. Mirabito
Attorney—Michael S. Striker

[57] ABSTRACT

A slide projector whose housing is formed with a tunnel extending in parallelism with the optical axis of the projection lens for reception of stepwise advancing straight slide trays, and with a pocket which communicates with a median portion of the tunnel and permits insertion of a circular slide tray upon removal of a straight tray. The bottom wall of the tunnel is provided with two segment-shaped cams which can enter parallel channels provided in the undersides of straight trays or concentric annular channels in the undersides of circular trays to lift slides from a lower level to a higher level. The thus raised slides are located at a level above a straight or cylindrical panel of a straight or circular tray over which the slide changer must transport the slides toward viewing position. The circular trays are indexible about a vertical axis.

9 Claims, 7 Drawing Figures

PATENTED DEC 5 1972　　　3,704,943

INVENTOR
HELMUT RUBE
BY
Michael S. Striker
his ATTORNEY

INVENTOR
HELMUT RUBE
BY
Michael S. Striker
his ATTORNEY

INVENTOR
HELMUT RUBE
BY
Michael S. Studer
his ATTORNEY

SLIDE PROJECTOR FOR USE WITH STRAIGHT AND CIRCULAR SLIDE TRAYS

BACKGROUND OF THE INVENTION

The present invention relates to slide projectors in general, and more particularly to slide projector arrangements wherein the housing of the slide projector can accept and support straight (bar-shaped) or circular slide trays. Still more particularly, the invention relates to improvements in slide projector arrangements of the type wherein a ramp or an analogous cam serves as a means for lifting successive slides so that a slide changer is capable of transporting the thus raised slides between the compartments of the tray and a viewing position.

German Pat. No. 1,033,928 discloses a slide projector which can be used with straight magazines or trays of the type having a bottom panel provided with a straight channel which communicates with the slide compartments and extends into the partitions between such compartments so that it can permit entry of a stationary ramp provided in the projector housing and serving to lift slides into the range of a slide changer. Each straight magazine which is to be used in such slide projectors is normally provided with a relatively high and a relatively low side panel which latter must be cleared by a raised slide in order that the thus raised slide can be transported toward viewing position. The purpose of the side panels is to prevent lateral displacement of slides in the compartments which extend between the two side panels. Also, such side panels prevent the slides from leaving the respective compartments in response to unintentional tilting of the straight tray during insertion into or during removal from the housing of the slide projector, or in storage.

The aforementioned ramp or cam in the slide projector which is disclosed in German Pat. No. 1,033,928 engages the central portion of the lower edge of a slide mount to prevent tilting of the slide during lifting and to thus avoid damage to the slide during engagement with and during transport by the slide changer. Certain other types of straight trays are provided with a wider and with a narrower channel the former of which can accommodate a wider ramp and the latter of which receives a narrower ramp. Such pairwise ramps also serve as a means for lifting the slides without appreciable tilting during indexing of the tray with reference to the housing of the slide projector.

A serious drawback of all conventional slide projectors which employ lifting ramps is that their housings can accommodate or support straight trays but that such housings are not suited for use with circular slide trays. As a rule, the ramps are elongated straight elements consisting of metal or plastic and, therefore, they could not enter a circular channel which would have to be provided in a circular slide tray.

SUMMARY OF THE INVENTION

It is an important object of my present invention to provide an arrangement which includes a slide projector capable of being used with different types of slide trays and to provide the housing of the slide projector with novel lifting means which is capable of raising slides in circular or straight trays.

Another object of the invention is to provide a slide projector which can be used with certain presently known types of straight trays as well as with novel circular slide trays.

A further object of the invention is to provide a slide projector whose housing can accommodate straight slide trays as well as circular slide trays which are indexible about a vertical or nearly vertical axis so that they need not extend above the housing or extend only slightly beyond the topmost part of such housing.

Still another object of the invention is to provide circular slide trays which can be utilized in slide projectors of the above outlined character.

An ancillary object of the invention is to provide a novel lifting device which can be utilized in the housing of a versatile slide projector to raise slides from compartments in circular trays or from compartments of straight trays.

A further object of the invention is to provide a lifting device which can lift slides in circular or straight trays without any tilting and to a level at which a raised slide can be transported without any interference toward and away from viewing position.

The improved arrangement comprises a slide projector including a housing, slide changer means installed in the housing for movement (either by hand or by means of a motor) between first and second positions to thereby transport slides between the compartments of a slide tray and a viewing position, and lifting means provided in the housing at a level below the slide changer means and having faces arranged to raise successive slides stored in a tray which is indexibly inserted into the housing from a lower level to a higher level. The outline of the lifting means is such that it can enter at least one straight channel or slot provided at the underside of a straight tray upon insertion of the straight tray into the housing of the slide projector or into at least one annular channel or slot provided in the underside of a circular tray when the latter is inserted into the housing upon removal of the straight tray.

In accordance with a presently preferred embodiment of my invention, the lifting means comprises two fixed cams or ramps which extend upwardly from a bottom wall of the housing and each of which has an outline resembling that of the segment of a circle. The faces of each cam preferably include a centrally located horizontal top face and two end faces which are inclined downwardly in opposite directions and flank the respective top face. The end faces guide the lower edges of slide mounts during movement toward or off the respective top faces.

The novel features which are considered as characteristic of the invention are set forth in particular in the appended claims. The improved arrangement itself, however, both as to its construction and its mode of operation, together with additional features and advantages thereof, will be best understood upon perusal of the following detailed description of a specific embodiment with reference to the accompanying drawing.

DESCRIPTION OF THE PREFERRED EMBODIMENT

Figure 1:
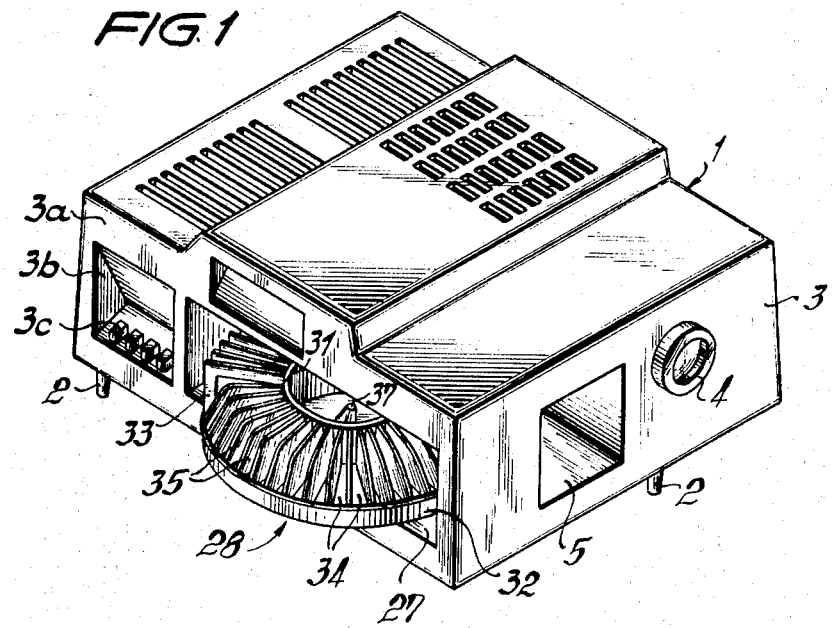
FIG. 1 is a perspective view of an arrangement which embodies the invention, a circular slide tray being shown in operative position in the housing of the slide projector.

FIG. 1, illustrates an arrangement which comprises a slide projector and a circular slide tray 28. The slide projector includes a housing 1 having legs 2 and a front wall 3 supporting a lens barrel 4. The housing 1 is further provided with a straight horizontal passage or tunnel 5 which is parallel to the optical axis of the projection lens and serves, among others, to guide a straight slide tray 6, shown in FIGS. 4 and 5, which can be used as a substitute for the circular tray 28. The straight tray 6 preferably consists of synthetic plastic material and comprises a bottom panel 7, a relatively high side panel 8, and a relatively low side panel forming a rack 9 provided with teeth 10 which can mesh with the teeth of an indexing or advancing gear 11 mounted in the housing 1. The tray 6 further comprises a set of partitions 13 which define compartments 12 for slides 14. The slides 14 can be transported between the compartments 12 and a viewing position in which they extend across the optical axis. The means for transporting the slides comprises a slide changer 16 which is reciprocable in directions indicated by a double-headed arrow 15. The means for actuating the slide changer 16 forms no part of the present invention.

The housing 1 further comprises a bottom wall 17 which extends at a level below the tunnel 5 and is affixed to a base plate 18 by recessed screws 19. The bottom wall 17 supports an upwardly extending shaft 20 for the aforementioned gear 11.

Figure 4:
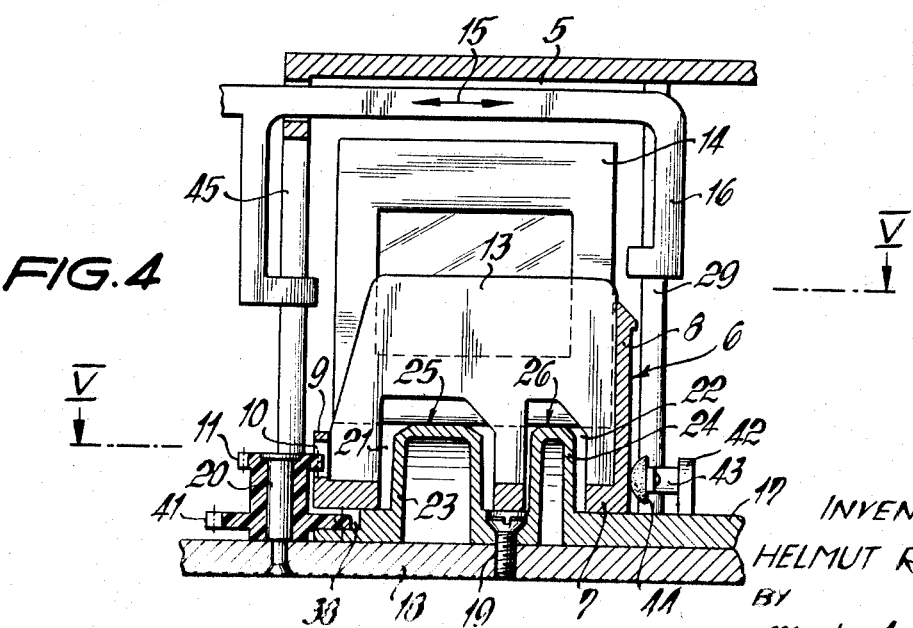
FIG. 4 is a fragmentary transverse vertical sectional view of the housing in the slide projector and of a straight slide tray which is inserted into the tunnel defined by the projector housing.
Figure 6:
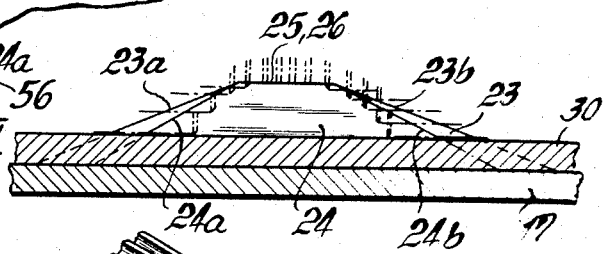
FIG. 6 is an enlarged sectional view substantially as seen in the direction of arrows from the line VI—VI of FIG. 5.
Figure 7:
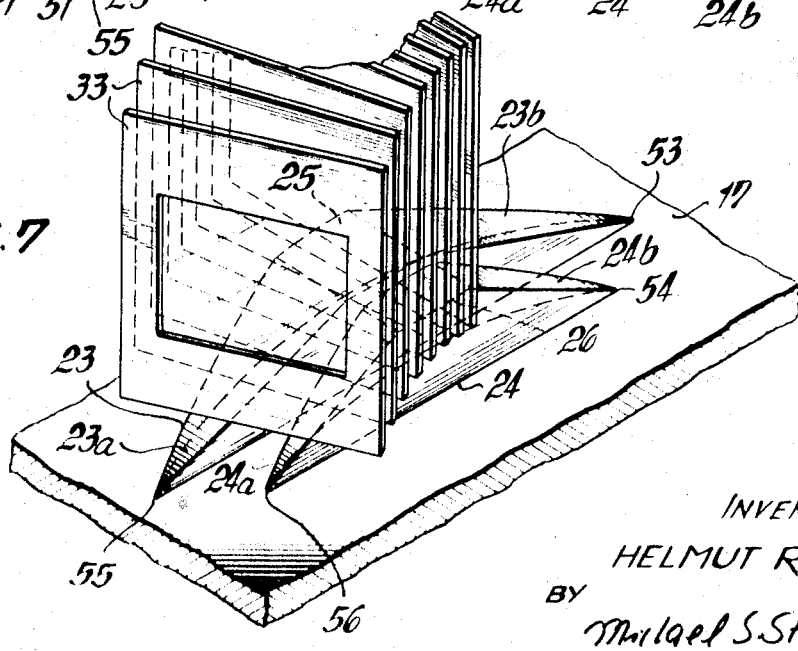
FIG. 7 is an enlarged perspective view of a portion of the structure shown in FIG. 3.

The bottom panel 7 of the straight tray 6 is formed with two longitudinally extending parallel slots or channels 21, 22 which extend well into the lower portions of the partitions 13 (see FIG. 4). When the tray 6 is inserted through the rear end of the tunnel 5, the channels 21, 22 respectively accommodate two lifting cams or ramps 23, 24. These cams or ramps are respectively formed with centrally located flat top faces 25, 26 which are disposed in the region of the slide changer 16 so that they can maintain in raised position that slide 14 which is to be transported to viewing position. The common plane of the top faces 25, 26 is located at the level of or above the topmost part of the lower side panel or rack 9. The ramps are further provided with inclined end faces 23a, 23b and 24a, 24b which slope gradually in opposite directions from and flank the corresponding top faces 25, 26. This is best shown in FIGS. 6 and 7.

Figure 2:
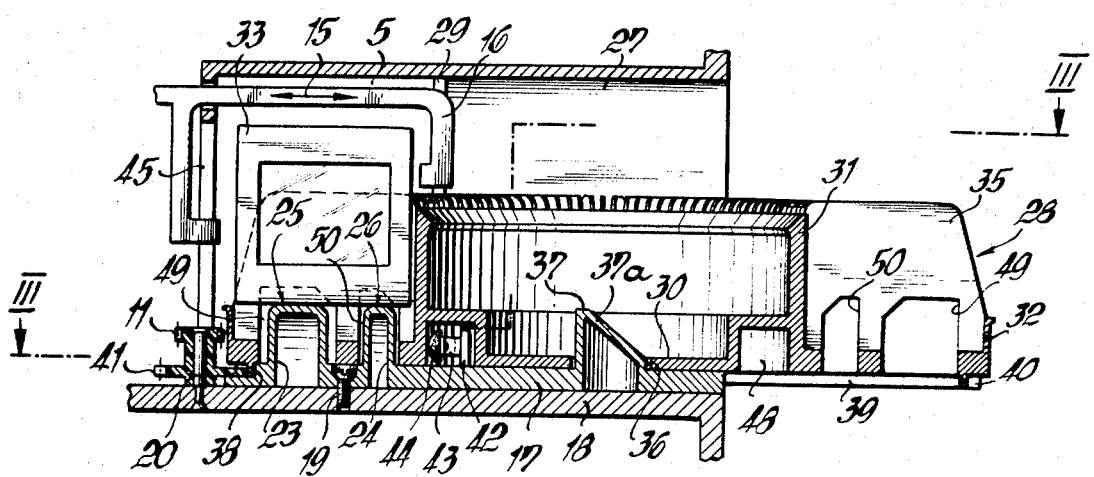
FIG. 2 is an enlarged fragmentary transverse vertical sectional view of the structure shown in FIG. 1.

Referring again to FIG. 1, the right-hand side wall 3a of the housing 1 is provided with a relatively shallow recess 3b which accommodates a row of actuating buttons 3c serving to initiate and terminate various operations of the slide projector, such as starting and arresting the motor which drives the slide changer 16 and the gear 11, turning on or off the projection lamp, and others. In addition, the side wall 3a is formed with a relatively deep rectangular pocket 27 which communicates with a median portion of the tunnel 5 and permits insertion of the circular slide tray 28 in such a way that, when properly inserted, the tray 28 is indexible about a vertical axis. As shown in FIG. 2, the housing 1 has an internal side wall 29 which is adjacent to one side of the tunnel 5 and is provided with an opening or cutout which establishes communication between the pocket 27 and the tunnel 5 and permits introduction of a portion of the circular tray 28 into the median portion of the tunnel. The tray 28 comprises a disk-shaped bottom panel 30, a relatively high cylindrical inner panel or shell 31 and a relatively low cylindrical outer panel or shell 32. Thin partitions 35 extend radially between the shells 31, 32 and define an annulus of radial compartments 34 for slides 33.

Figure 5:
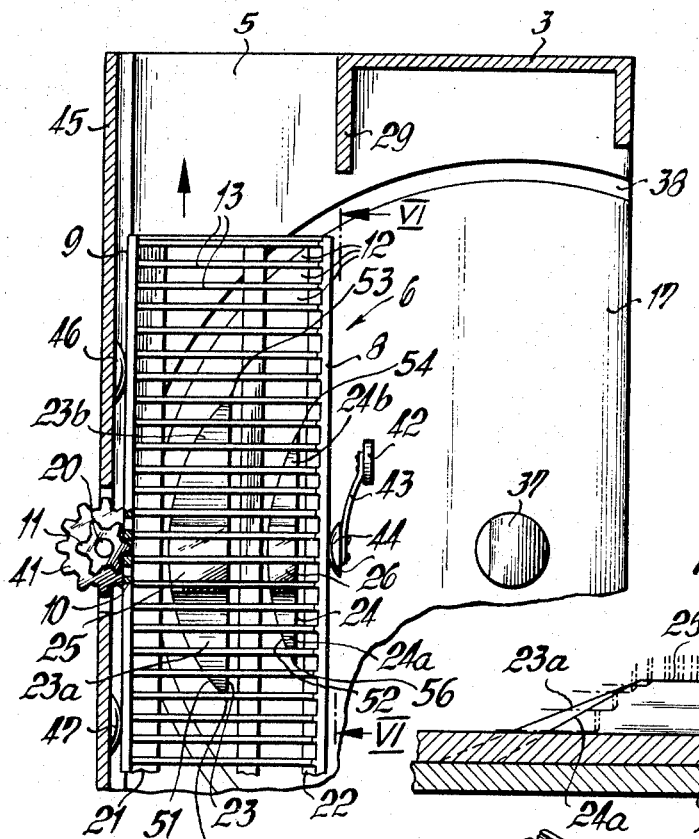
FIG. 5 is a horizontal sectional view substantially as seen in the direction of arrows from the line V—V of FIG. 4.

The bottom panel 30 of the tray 28 has a centrally located opening 36 which can accommodate a locating or positioning projection 37 here shown as a stub extending upwardly from the bottom wall 17 of the housing 1 and being accommodated in the pocket 27. The stub 37 has an inclined facet or flat 37a so that the cross-sectional area of its tip is considerably smaller than the cross-sectional area of the lower end of the stub. This facilitates insertion of the stub into the opening 36. It will be noted that the flat 37a faces the open side of the pocket 27. As shown in FIG. 5, the upper side of the bottom wall 17 is further formed with an arcuate groove 38 which can receive a portion of a circular rim 39, extending downwardly from the bottom panel 30 of the circular tray 28, when the latter is properly inserted into the pocket 27 so that the opening 36 receives the stub 37. The rim 39 has an annulus of teeth 40 forming an external gear which meshes with an indexing gear 41 on the housing 1. The gear 41 is coaxial and integral with the gear 11 and can rotate therewith on the shaft 20.

The pocket 27 further accommodates a bracket or retainer 42 for a leaf spring 43 which carries a rounded biasing or pressure transmitting member 44. The latter can engage the side panel 8 of the straight tray 6 when this tray extends into the tunnel 5 so that the spring 43 then biases the teeth 10 of the lower side panel or rack 9 into mesh with the teeth of the gear 11. The parts 42–44 form a portion of a guide assembly for the tray 6 and cooperate with two protuberances 46, 47 (shown in FIG. 5) to properly guide the tray 6 in the region where the tray advances along the pocket 27. The protuberances 46, 47 are provided on a second internal side wall 45 of the housing 1; this side wall 45 is adjacent to the other side of the tunnel 5, i.e., it is located opposite the side wall 29. When the straight tray 6 is replaced with the circular tray 28, the biasing member 44 engages the lower portion of the inner cylindrical shell 31 to bias the teeth 40 into mesh with the teeth of the indexing gear 41. The parts 42–44 then extend into a circular groove 48 (FIG. 2) provided in the underside of the bottom panel 30 radially inwardly of the shell 31. An important advantage of the parts 42–44 is that they insure proper mesh between the teeth 40 and the teeth of indexing gear 41 even if the diameter of the opening 36 exceeds considerably the maximum diameter of the positioning stub 37. This is desirable to facilitate insertion and centering of the circular tray 28.

Figure 3:
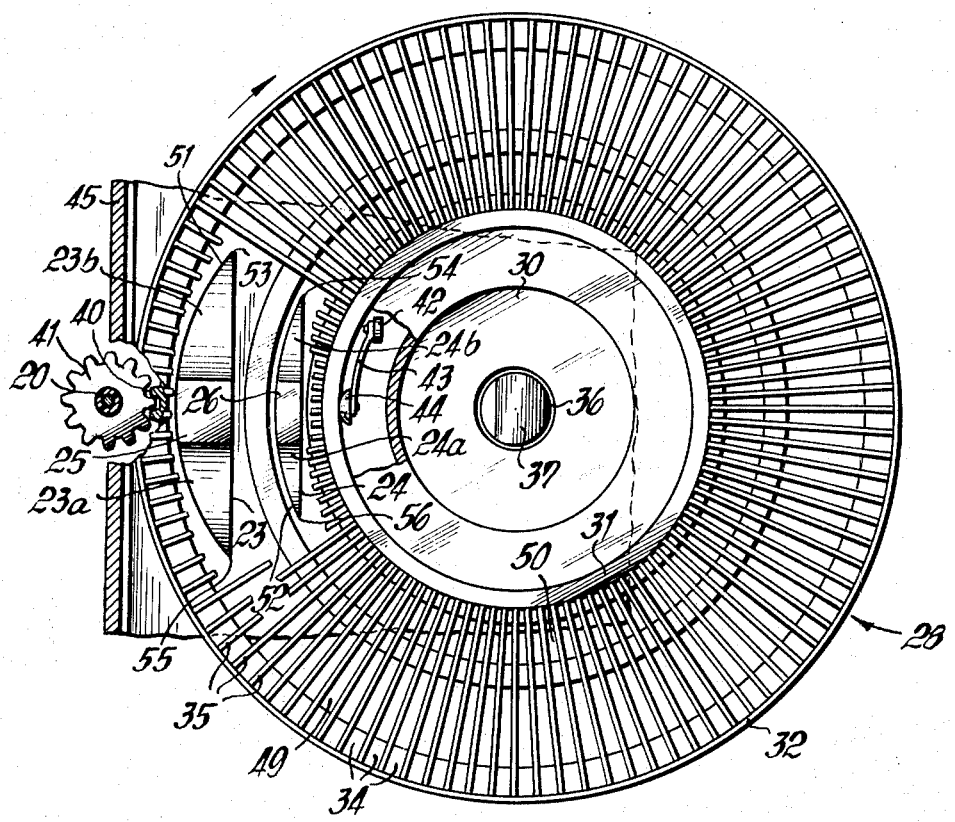
FIG. 3 is a horizontal sectional view substantially as seen in direction of arrows from the line III—III of FIG. 2.

The bottom panel 30 of the circular tray 28 is further formed with two relatively deep concentric annular slots or channels 49, 50 which are disposed between the cylindrical shells 31, 32 and extend well into the lower portions of the partitions 35. This is best shown in the right-hand part of FIG. 2. The distance between the channels or slots 49, 50 is the same as that between the channels or slots 21, 22 of the straight tray 6, and the cross-sectional areas of the channels 49, 50 respectively equal the cross-sectional areas of the channels 21, 22. Thus, that portion of the circular tray 28 which extends into the tunnel 5 is similar to the corresponding portion of the straight tray 6. The channels 49, 50 can respectively accommodate the cams or ramps 23, 24 (see FIGS. 2 and 3) so that the top faces 25, 26 of these ramps can raise above the outer panel or shell 32 that slide 33 which is about to be transported to viewing position. The outlines of the ramps 23, 24 are best shown in FIGS. 3 and 5. It will be seen that these outlines are selected with a view to insure entry of the ramps into the channels 21, 22 or 49, 50 and to further insure that the top faces 25, 26 of the ramps can lift slides 14 or 33. Furthermore, the configuration of inclined end faces 23a, 23b and 24a, 24b on the ramps 23, 24 is such that they can gradually lift and lower the slides 14 or 33 in untilted positions, i.e., so that the bottom edges of the slide mounts are always parallel to the top face of the bottom plate 17. The outlines of the ramps 23, 24 resemble segments of circles having different radii. The radius of curvature of the arcuate (convex) outer side 51 of the ramp 23 is slightly less than the maximum radius of the channel 49, and the radius of curvature of the convex outer side 52 of the ramp 24 is slightly less than the maximum radius of the inner channel 50 (see FIG. 3). The tips 53, 55 of the ramp 23 are disposed at the ends of a flat inner side of this ramp which inner side is parallel to the tunnel 5. The same applies for the tips 54, 56 of the ramp 24. The tips 53, 54 and 55, 56 are respectively located in two planes which extend radially from the axis of the positioning stub 37. In other words, the ramp 24 is shorter than the ramp 23, as considered in the circumferential direction of the circular tray 28 in fully inserted position. The end faces 24a, 24b of the ramp 24 are somewhat steeper than the end faces 23a, 23b of the ramp 23 (see FIG. 6). This insures that the lower edge of the mount of a slide 33 is held in a horizontal plane in response to successive indexing movements of the circular tray 28. In other words, such difference in the inclination of end faces 23a, 23b and 24a, 24b insures that the lower edge of a slide mount engages such portions of end faces 23a, 24a or 23b, 24b which are located at the same level.

The operation is as follows:

If the user wishes to project the images of a set of slides 14 which are stored in a straight tray 6, the circular tray 28 is removed and the tray 6 is inserted through the rear end of the tunnel 5 so that the teeth 10 of its side panel or rack 9 engage the teeth of the gear 11. The rack 9 is then adjacent to the internal side wall 45 of the housing 1 (FIG. 5). When the gear 11 meshes with the rack 9, at least one of the foremost slides 14 in the tray 6 is already lifted by the inclined end faces 23a, 24a of the ramps 23, 24 because these ramps then extend into the channels 21, 22. The tip 55 of the longer ramp 23 engages the median portion of the lower edge of the mount of the foremost slide 14 and such mount is thereupon moved to a higher level while remaining in a horizontal position. The arrangement is preferably such that the foremost slide 14 already rests on the top faces 25, 26 when the leading end of the rack 9 begins to mesh with the gear 11. As stated before, the lower edge of the mount of the foremost slide 14 is then raised to a level above the rack 9 (see FIG. 4). This enables the slide changer 16 to transport the foremost slide 14 to viewing position behind the lens barrel 4 and to thereupon return the foremost slide into the corresponding compartment 12. The gear 11 is then caused to advance the tray 6 by a step so as to place the next slide 14 into registry with the slide changer 16 whereby the next slide rests on the central portions of the top faces 25, 26 at a level above the rack 9. Slides 14 which are returned into the compartments 12 thereupon slide downwardly along the inclined faces 23b, 24b and beyond the rear tips 53, 54 of the ramps 23, 24 to come to rest on the bottom panel 7 of the tray 6.

If the straight tray 6 is to be replaced with the circular tray 28, the tray 6 is withdrawn through the front end of the tunnel 5 so that the user can insert the tray 28 through the pocket 27 in horizontal or nearly horizontal position and in such a way that the bottom panel 30 of the tray 28 is located at a level slightly above the tip of the positioning stub 37. When the opening 36 in the bottom panel 30 registers with the stub 37, the tray 28 can descend by gravity and the rim 39 enters the arcuate groove 38 of the bottom plate 17 so that the teeth 40 below the shell 32 mesh with the teeth of the indexing gear 41 (FIG. 2 or 3). At the same time, the ramps 23, 24 enter the adjoining slides 33. As stated before, the top faces 25, 26 are located at the same level so that any slide 33 which comes to rest on these top faces is automatically held in a raised position in which its lower edge is horizontal. The same holds true for those slides whose lower edges respectively rest on the inclined end faces 23a, 24a or 23b, 24b. This is due to the aforementioned difference in inclination of such end faces (see FIG. 6). The operation of the slide projector is more secure and more reliable if all the slides are held in positions in which their lower edges remain horizontal.

When the motor of the slide projector is started, the slide changer 16 engages that raised slide 33 which is in registry therewith and rests on the central portions of the top faces 25, 26. The slide changer 16 then moves such slide at a level above the relatively low outer shell 32 and toward viewing position. When the projection of the image of the first slide 33 is completed, the slide changer 16 returns it into the corresponding compartment 34 and the gear 41 indexes the tray 28 by a step so as to move the next-following slide 33 into registry with the slide changer. The same procedure is repeated until the operator decides to withdraw the tray 28 or until after the viewing of all slides 33 is completed.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In an arrangement of the character indicated, a combination comprising a straight slide tray having transversely extending compartments for slides and an underside provided with a pair of straight parallel channels communicating with said compartments; a circular slide tray having radially extending compartments for slides and an underside provided with a pair of concentric annular channels communicating with said last mentioned compartments; and a slide projector including a housing having first and second passages respectively arranged to receive said straight and circular trays, said passages having a common portion so that said first passage is free to receive said straight tray only when said circular tray is removed from said second passage and vice versa, slide changer means installed in said housing for movement between first and second positions to thereby transport slides between those compartments of one of said trays which are located in said common portion of said passages and a viewing position, and lifting means comprising a pair of cams provided in said common portion of said passages below said slide changer means and having faces arranged to raise from a lower level to a higher level successive slides in that one of said trays which is inserted into the respective passage, the positions of said cams being such that each thereof enters a different one of said straight channels from below said channels upon insertion of said straight tray into said first passage and a different one of said annular channels on insertion of said circular tray into said second passage, portions of said annular channels and said straight channels being disposed in said common portion of said passages when said straight and circular trays are alternatively used, said circular tray being indexible about a substantially vertical axis and said straight tray being indexible lengthwise upon insertion into the respective passage of said housing.

2. A combination as defined in claim 1, wherein said first passage is a straight tunnel and said second passage is an open-sided pocket, said housing including a bottom wall having a portion located below said common portion of said passages and said cams being provided on said portion of said bottom wall.

3. A combination as defined in claim 1, wherein at least one of said cams has a substantially straight side and a convex side.

4. A combination as defined in claim 3, wherein the faces of said cam include a substantially horizontal top face on which a slide rests in the raised position thereof and a pair of end faces inclined downwardly in opposite directions and flanking said top face.

5. A combination as defined in claim 1, wherein said straight tray has a side panel which is located at a level below a slide which is lifted to its raised position when the straight tray is inserted into said housing so that the slide changer means can transport such slide over the side panel toward said viewing position.

6. A combination as defined in claim 1, wherein said circular tray has a relatively low cylindrical outer shell located at a level below a slide which is lifted by said cams to raised position in response to insertion of the circular tray into said housing so that the slide changer means can move the thus raised slide over said outer shell during transport to viewing position.

7. A combination as defined in claim 1, wherein each of said cams comprises a top face located at the level of the top face of the other cam and a pair of end faces inclined downwardly in opposite directions and flanking the respective top face to effect gradual lifting and lowering of slides onto and from said top faces in response to stepwise indexing of the respective tray.

8. A combination as defined in claim 7, wherein the inclination of end faces on one of said cams deviates from the inclination of end faces on the other cam.

9. A combination as defined in claim 1, wherein the outlines of said cams are segments of circles having different radii.

* * * * *